Jan. 10, 1956  F. W. KING  2,730,027
APPARATUS FOR DEVELOPING PHOTOGRAPHIC FILM AND THE LIKE
Filed Oct. 20, 1949  3 Sheets-Sheet 1
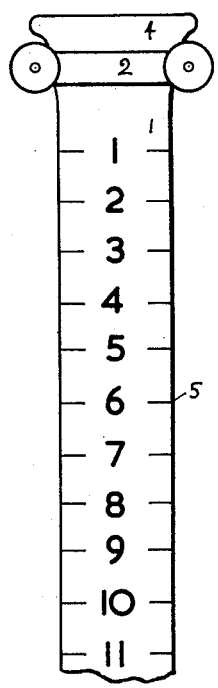
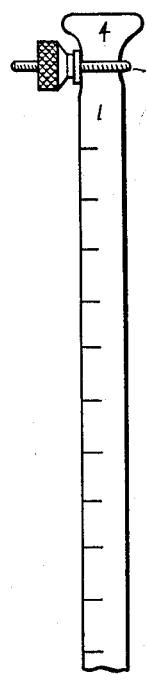
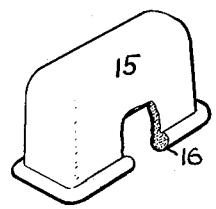
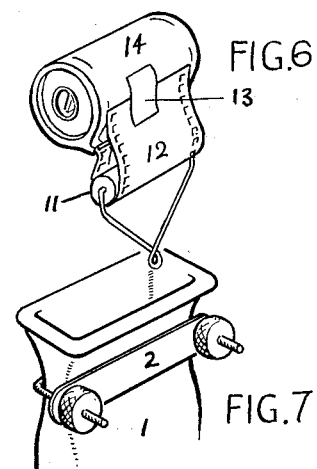
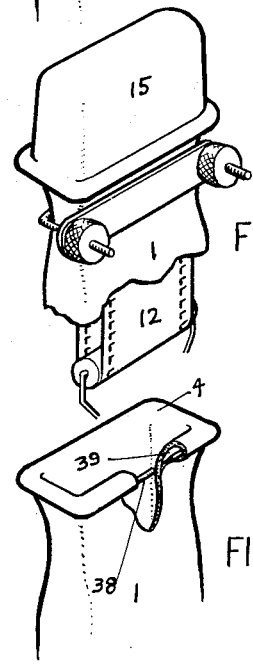
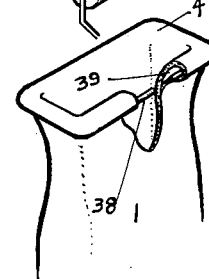
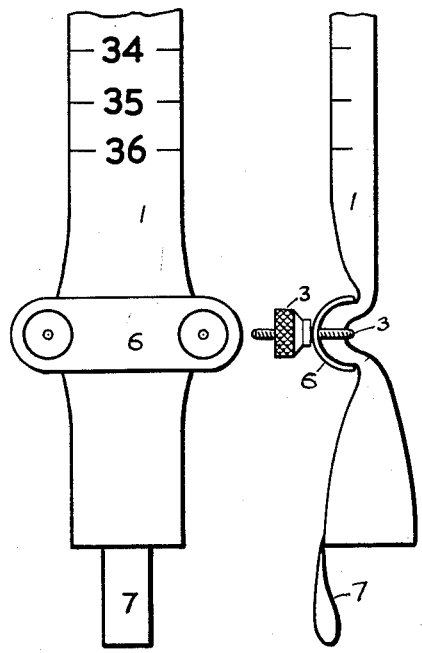
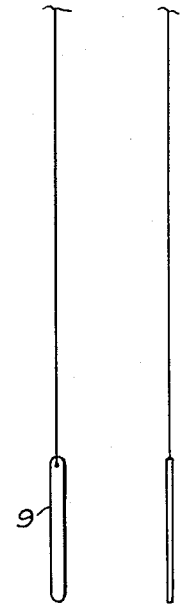

Jan. 10, 1956　　　　　F. W. KING　　　　　2,730,027
APPARATUS FOR DEVELOPING PHOTOGRAPHIC FILM AND THE LIKE
Filed Oct. 20, 1949　　　　　　　　　　　3 Sheets-Sheet 2

F. W. King

Jan. 10, 1956  F. W. KING  2,730,027
APPARATUS FOR DEVELOPING PHOTOGRAPHIC FILM AND THE LIKE
Filed Oct. 20, 1949  3 Sheets-Sheet 3
FIG. 15
FIG. 16
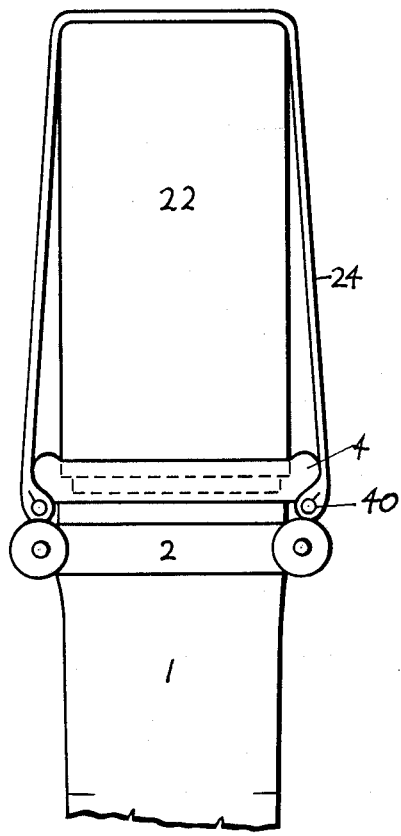
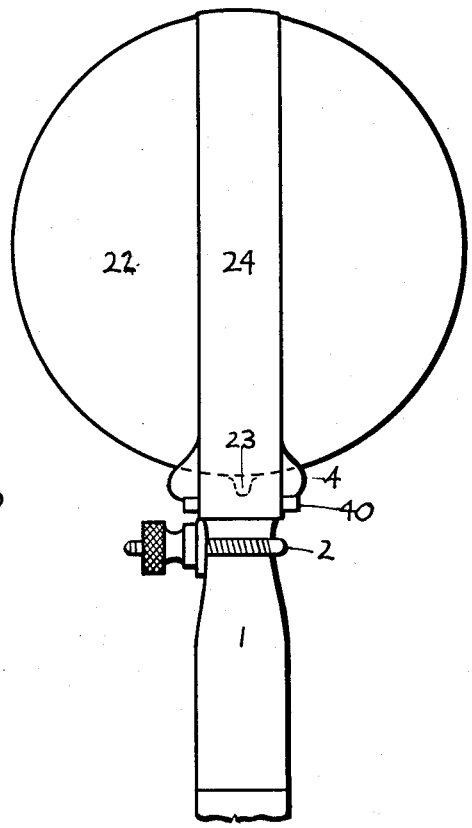
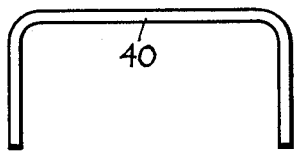
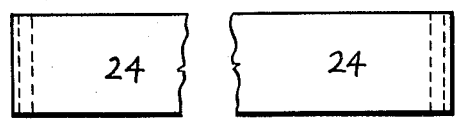
FIG. 17
FIG. 18
F. W. King.

United States Patent Office 2,730,027
Patented Jan. 10, 1956

2,730,027

APPARATUS FOR DEVELOPING PHOTOGRAPHIC FILM AND THE LIKE

Francis William King, New Malden, England

Application October 20, 1949, Serial No. 122,369

8 Claims. (Cl. 95—90.5)

This invention relates to apparatus for processing photographic film and the like.

Apparatus has been proposed wherein films are introduced into a rubber tube for development, and it is known to use clamps for closing the tube, such apparatus being characterised in that it is flexible and adapted for folding into a small space when not in use. An object of the present invention is to provide improved apparatus of this kind characterised in that one end of the tube is formed as a funnel with a zigzag passage into the tube. Hitherto the use of flexible tubes for processing photographic film has been subject to the risk of the film sticking to the tube when processing liquid is first introduced, it is a feature of the present invention that a method is used for the introduction of liquid such that sticking is avoided. A further object of the invention is so to construct one form of the apparatus that it may be used for the analogous purpose of measuring unexposed film from a bulk container and loading it into a cassette.

The present invention comprises a thin-walled tube of opaque flexible rubber or like material adapted to contain a film, a clamp for closing the tube situated near each end thereof, means for transporting the film into the tube from a holder arranged at the one end thereof, characterised in that at the other end the clamp has a curved jaw attached to the tube and deforming it so that the passage inside the tube has a zigzag course where it passes through said clamp.

Two ways of carrying the invention into effect will now be described by way of example and with reference to the accompanying drawings, in which Figs. 1–9 show views of an embodiment of the invention adapted for use with films in cassettes, whilst Figs. 10–14 show views of a second embodiment adapted to develop roll films. Figs. 15–18 illustrate a way in which the developing apparatus for use with films in cassettes may be used for the analogous purpose of loading cassettes with unexposed film from a bulk container.

In the drawings.

Figs. 1 and 2 are front and side elevations respectively of a daylight-loading developing apparatus for use with films in cassettes.

Figs. 3 and 4 are similar views of the means used for transporting the film into the tube.

Fig. 5 is a view of a cassette cover adapted to fit over the mouth of the tube.

Fig. 6 is a view of a film cassette showing one method of preparing the film for transport into the tube.

Fig. 7 is a view of the mouth of the tube.

Fig. 8 shows the top of the tube with the cassette and cassette cover in position and with the film partly transported into the tube.

Fig. 9 shows an enlarged view of the mouth of the tube broken away to show a preferred construction of the resilient lip.

Figs. 15 and 16 are front and side elevations respectively of a bulk film container held in light-excluding engagement against the mouth of the developing apparatus for films in cassettes.

Fig. 17 is a plan view of part of the means for holding the container.

Fig. 18 is a broken view of the rubber band used for holding the container.

Figure 10:
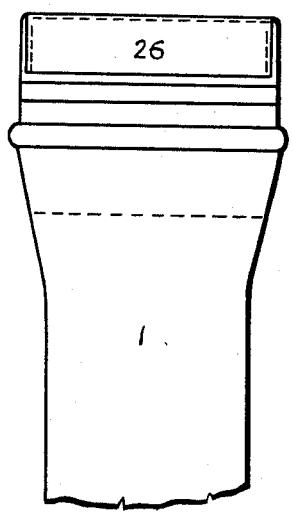
Figs. 10, 11 and 12 are front, side and rear elevations respectively of the roll film container and the top part of the tube of a roll film developing apparatus.
Figure 11:
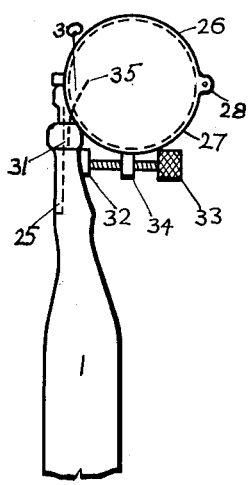
Figure 12:
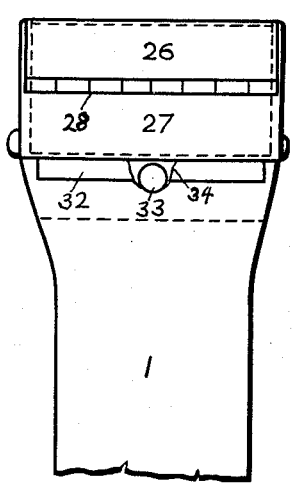

Referring to Figs. 1 and 2, the tube 1 is of thin, opaque, flexible rubber or like material, inert to the fluids used, open at both ends and of suitable size to contain the film. The clamps 2 and 3 are preferably bonded or otherwise attached to the tube near its ends and can be closed to prevent fluid escaping from the thus enclosed part of the tube. The upper end of the tube is thickened and enlarged to form a mouth with a resilient lip 4. The internal form of this mouth is such that it will receive the slotted part of a film cassette or container and keep it with the slot pointing into the tube. A preferred construction of this end of tube 1 is shown in Fig. 9. The resilient lip 4 is held by a rigid frame 38 to receive the slotted part of a film cassette or container. To enable it better to conform to different cassettes or containers, the resilient lip 4 has an enclosed air space 39 round its inner side. The body of the tube between clamps 2 and 3 is marked with a scale 5 to indicate the amount of film passing into it. The clamp 3 has a curved plate 6 of such width and curvature that the clamp may be partly opened without admitting light to the inner part of the tube. This construction of clamp 3 is shown in Fig. 2. The extreme end of the tube has a loop 7 by which the apparatus may be suspended.

Referring to Figs. 3 and 4, the thread 8 is of nylon or like chemically inert material and has at one end a flat weight 9 and at the other a bridle 10 with a roller 11. The thread should be slightly longer than the tube 1 when extended. The bridle 10 is preferably made from stainless steel wire and the roller 11 of soft rubber with a tubular axle of similar material to the bridle.

To load a film from a cassette into the tube 1, clamps 2 and 3 are fully opened and the weighted thread 8 is dropped through the tube until the bridle 10 is just above its mouth. Clamp 3 is now partly closed by screwing down the milled nuts say halfway, until a condition is reached such that light cannot pass along the tube past the clamp, although there is free passage to the thread 8 or to developing liquids. The end of the film projecting from the cassette is passed through the bridle under the roller and doubled back and anchored to the cassette in the manner shown in Fig. 6 which shows the end of the film 12 secured by a strip of adhesive tape 13 to the side of cassette 14. The emulsion surface of the film should be outward, away from the roller.

The bridle 10 is now entered into the mouth of tube 1, shown in Fig. 7, followed by the loop of film and the roller 11 until the cassette 14 rests on the resilient lip 4 with the slot directed into the tube. The opaque cassette cover 15, shown in Fig. 5, is now passed over the cassette and its thickened rim 16 passed down over the outside of resilient lip 4 so that the cover holds the cassette firmly against it and excludes light. The film is then drawn from the cassette into the tube by pulling on the weight 9 while supporting the apparatus from beneath resilient lip 4. Because of the design of clamp 3, no light can enter at the lower end of the tube during the operation and the apparatus is therefore daylight-loading. An early stage in loading is shown in Fig. 8. The amount of film passing into tube 1 is shown by the position of the deformation of the tube caused by the bridle 10 with respect to the scale 5.

It will be obvious that the procedure described for loading exposed film into tube 1 for development may be used also for measuring lengths of unexposed film for reloading cassettes. Examples of this use of the apparatus are shown in Figs. 15–18, in which Figs. 15 and 16 show front and side views respectively of a known type of bulk film container 22 held with its slot 23 pointing into tube 1 by an elastic band 24 which presses the container firmly against the resilient lip 4 to exclude light.

The device for holding the container against the resilient lip 4 is shown in detail in Figs. 17 and 18. The metal U piece 40 is of such size that it will pass between the lower part of the resilient lip 4 and the clamp 2, and in this position form an anchorage for the ends of the elastic band 24. The elastic band has a hole at each end to receive the limb of the U piece and its length and thickness are such that it will exert sufficient pressure on the film container to hold it in light-excluding engagement with the resilient lip 4. The film may be drawn from the container into the tube 1 by the procedure already described.

When the required amount of film has passed into tube 1, the clamp 2 should be tightened and the container 22 removed by slipping off the elastic band 24 and severing the film close to the slot in the container. Sufficient film should be left projecting from the mouth of tube 1 to allow it to be attached to the spool of a film cassette and the cassette assembled. When this has been done and the other end of the film anchored as already described, press the cassette into the mouth of tube 1 so that the resilient lip excludes light. The clamp 2 is undone and the film may be wound into the cassette by turning the spool.

To develop an exposed film loaded into the apparatus by any of the methods previously described, the clamp 2 is tightened and the cassette removed, severing the film if any remains. The apparatus should now be held suspended from loop 7 and the developer poured in the end of the tube 1 as rapidly as it will pass through clamp 3. The vertical attitude of tube 1 during this operation and the facility for rapid introduction of the developer due to this, and to the design of clamp 3, are features which enable developing apparatus constructed according to this invention to avoid difficulties due, for example, to the film sticking to the wall of tube 1.

When all the developer has passed into the body of tube 1, clamp 3 should be tightened and the apparatus shaken vigorously to ensure that all parts of the film are wetted, thereafter development will proceed normally if the apparatus be lain horizontally and turned occasionally. Development can be completed in a much shorter time than is required with rigid developing tanks if the apparatus be moved continuously to make the developer flow from end to end of tube 1, and this procedure also enables development to be effected with a smaller quantity of developer than is normally required in such tanks, the reduction in both quantities being of the order of 50%.

When development is judged complete, the developer may be emptied by partly undoing clamp 3. Rinsing and fixing baths may be introduced and removed in the same way as the developer. To wash the film after development, the apparatus is connected to a water tap by loop 7 and clamp 3 opened fully. The water is turned on and the flow through clamp 2 adjusted until the tube 1 is distended throughout its length. Under these conditions the film is washed rapidly and thoroughly. After washing, the film may be withdrawn from tube 1 from the loading end.

The modified form of the apparatus to be used when developing roll films is illustrated in Figs. 10–14. The tube 1 should be long enough to contain the film when extended and its cross-section should be such as to constrain said film to maintain an arcuate cross-section. At the top end, the mouth of the tube fits tightly over, and is bonded to the rigid extension 25 of a roll film container forming a light excluding joint therewith. The roll container is a hollow cylinder of rigid material with closed ends and of such size that it will contain the spool of film with a small clearance. The curved wall of the container is divided along its length into upper and lower parts 26 and 27, which are joined by the hinge 28 at the back. The upper part, hereinafter called the lid, when closed forms a light-excluding joint with the lower part. At the front there is a small gap between the lid and the lower part when the lid is closed, and the edges of this gap are rounded and faced with velvet or like material so that it forms the light-trapped slot 29. Another slot 30 is formed in the lower part of the container close to slot 29 and parallel with it. Slot 30 communicates through a passage 31 in extension 25 with the tube 1, and its dimensions and those of passage 31 are such as to allow the film to pass freely through them with the smallest practicable clearance. Extension 25 joins the container so as to surround slot 30 and so that the direction of its passage 31 is approximately tangential to the front of a roll film in the container. Extension 25 is so formed that across its top end, where it joins the container, its passage 31 is a straight parallel slot, but the passage has a transverse curvature increasing towards its lower end and where it communicates with tube 1. The purpose of this curvature is to impart an arcuate cross-section to a film passing through it into the tube 1. The rear wall of extension 25 is cut away a short distance below where it joins the lower part 27 of the container so as to permit the clamp plate 32 to effect closure of the passage 31. In the embodiment shown, the clamp plate 32 is actuated by a clamping screw 33 working in a lug 34 attached to the lower part of the container. It will be obvious that many detail variations of this design are possible. To guide the film into slot 30, and so to tube 1, the inner edge of the slot has a thin springy blade or scraper 35 attached to it and projecting into the container. This blade is preferably slightly less wide than the film and is arranged so that it presses evenly across the face of a full spool of film in the container. The top of the blade 35 should be sharp but with a rounded edge and it should not project above a straight line between the top of the spool spindle and the lower edge of slot 29.

The remaining parts of the developing apparatus shown in Figs. 10–14 are the same as that shown in Fig. 1 which has already been described, except that it is not necessary for the body of tube 1 to have a scale to indicate the length of film that has passed into it.

Figures 13, 14:
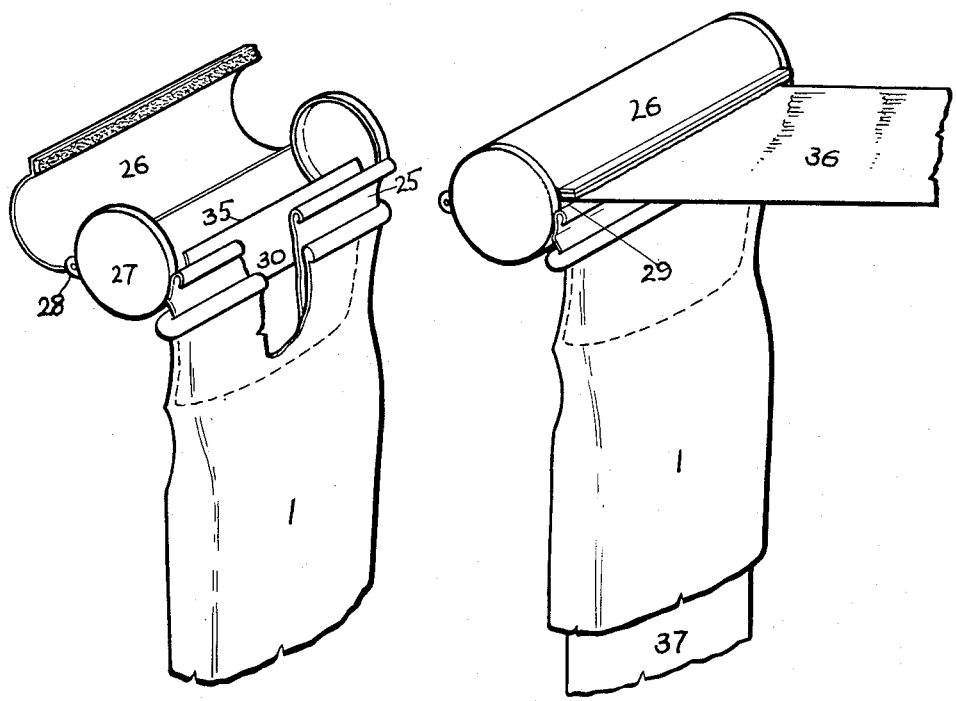
Fig. 13 is another view of the roll film container with its lid open and with the front part broken away to show the construction.
Fig. 14 shows the roll film container and the top part of the tube with a roll film partly loaded into the apparatus.

To load a roll film into the developing apparatus illustrated in Figs. 10–14, the clamping screw 33 is fully undone and the clamp 3 partly so, as hereinbefore described. The roll film is placed in the container with the end of the backing paper unfastened so that it unrolls from the top towards the front of the container. The end of the backing paper is drawn out for a few inches and the lid 26 closed on to it so that the paper is in slot 29. The apparatus should be now held with the tube 1 hanging vertically and the lid 26 closed. The film may be transported into tube 1 by drawing the backing paper out through slot 29. Fig. 14 illustrates this method of loading a roll film in daylight. The backing paper 36 is being drawn from the spool in the container out through slot 29 thus projecting the film 37 into tube 1. When all the film has passed into tube 1 the clamping screw 33 may be tightened and the remaining operations of development done as already described.

I claim:

1. A flexible and portable daylight-loading apparatus for processing or measuring and temporarily storing photographic film comprising a thin-walled tube of opaque flexible rubber or like material adapted to contain a film, a clamp for closing the tube situated near each end thereof, and means for transporting the film into the tube from a holder arranged at one end thereof, characterised in that at the other end the clamp has a curved jaw attached to the tube and deforming it so that the passage inside the tube has a zig-zag course where it passes through said clamp.

2. Apparatus according to claim 1 wherein the holder comprises a mouth with a resilient lip formed at the one end of the tube to receive the film slot of a cassette or film container and make a light-excluding joint therewith when said cassette or film container is pressed into said mouth.

3. Apparatus according to claim 1 wherein the holder consists of an opaque rubber cover adapted to enclose a cassette and to fit the end of the tube so as to hold said cassette in light-excluding engagement with the end of said tube.

4. Apparatus according to claim 1 wherein the tube is of such dimensions that the passage of the film inside it causes a visible deformation, and the outside of said tube is marked to indicate the length of film loaded.

5. Apparatus according to claim 1 wherein the film transport means comprise a weighted thread extended inside the tube and a bridle with a roller adapted to be attached to the film and drawn through the tube by pulling said thread.

6. Apparatus according to claim 1 wherein the holder comprises a light-tight roll film container with a light-trapped slot communicating with the exterior and adapted for removal of the backing paper, and another slot communicating with the tube adapted to permit passage of the film.

7. Apparatus according to claim 1 wherein the holder comprises a light-tight roll film container with a light-trapped slot communicating with the exterior and adapted for removal of the backing paper, and another slot communicating with the tube and adapted to permit passage of the film, wherein also said slot communicating with the tube has its wall extended outwardly from the roll film container into the tube and the passage through said extended part is transversely curved at the end remote from the roll film container.

8. Apparatus according to claim 1 wherein the tube is of such dimensions that a film passing from the holder into the tube with a transverse curvature is retained in such curvature.

References Cited in the file of this patent

UNITED STATES PATENTS

| Number | Name | Date |
|---|---|---|
| 917,002 | Church | Apr. 6, 1909 |
| 1,194,707 | Bryant | Aug. 15, 1916 |
| 1,317,398 | Shields | Sept. 30, 1919 |
| 1,481,759 | Suguira et al. | Jan. 22, 1924 |